Figure 1:
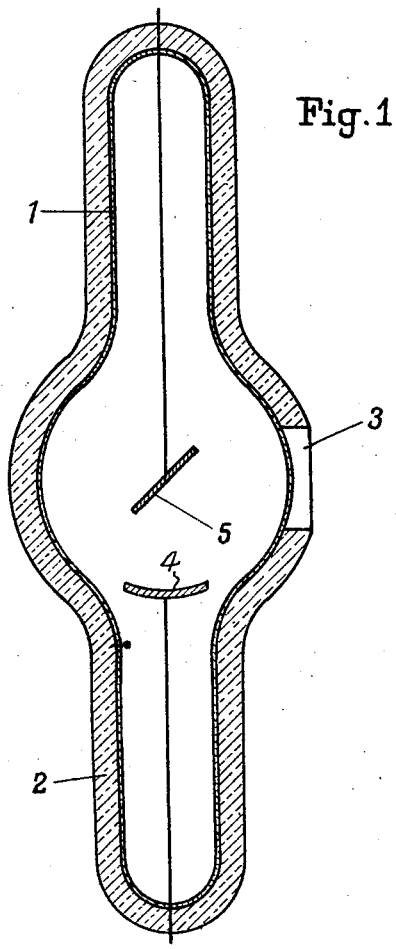

Nov. 8, 1927.

A. F. WUROMUS 1,648,526

RÖNTGEN TUBE AND MANUFACTURE OF SAME

Filed July 25, 1925

Inventor:
Arthur Fritz Wuromus
by Leo J. Matty att.

Patented Nov. 8, 1927.

1,648,526

UNITED STATES PATENT OFFICE.

ARTHUR FRITZ WUROMUS, OF BERLIN-ZEHLENDORF, GERMANY, ASSIGNOR TO THE FIRM SENDLINGER OPTISCHE GLASWERKE G. M. B. H., OF BERLIN-ZEHLENDORF, GERMANY.

RÖNTGEN TUBE AND MANUFACTURE OF SAME.

Application filed July 25, 1925, Serial No. 45,997, and in Germany July 31, 1924.

This invention has reference to Röntgen tubes and it is particularly intended to provide a tube of the kind referred to which, while presenting highly efficient vacuum qualities, is substantially protected from undesired Röntgen radiations. In accordance therewith it is one of the important objects of this invention to provide a bulb of high vacuum glass permeable for Röntgen radiation which kind of glass in the interest of brevity may be called hereafter a high vacuum Röntgen glass; with a glass coating substantially impermeable for Röntgen radiation, which if required, may be effected by means of the insertion of intermediate transition glass layers, the said coating or envelope of glass being melted onto the glass base so that the tube constitutes a unitary glass body with its envelope of a protecting glass layer. Broadly considered, it is sufficient to coat an ordinary Röntgen high vacuum glass with an enveloping glass coating of similar heat expansion and of sufficient percentage of lead contents and without the use of transition glass layers between the inner and outer layers. A compound Röntgen glass tube of this description presents the advantage as compared with the well known tubes with protecting layers loosely disposed upon the glass base that it presents an increased resistency against fracture and kicking through of the insulation.

The window for admitting as undisturbed as possible a discharge of the rays which is required in the case of tubes with protective layer is formed in the tube in accordance with this invention in the preferred construction by an interruption of the continuity of the surface of the exterior envelope produced by the Röntgen protective glass. The manufacture of the window is preferably carried out in accordance with my invention by the grinding off or etching of the glass coating at the particular places. Instead of leaving this window in the glass coating exposed, it may be closed by a special window inserted therein and which is transparent for Röntgen rays.

The window may also be produced by providing the compound tube with an aperture which not only passes through the enveloping and protecting glass coating, but through the high vacuum glass as well and by then closing this aperture by a window of a suitable kind of glass.

In further pursuance of my invention, the protecting glass coating may be colored, whenever required, in order to reduce the possibility of the escape of visible rays from the tube, if desired. The light absorbing colored envelope may also constitute an intermediate layer between the high vacuum glass and the enveloping and protecting glass coating. The coloration of this glass envelope presents the additional advantage from the point of view of manufacture that by this means it can be easily ascertained at what moment the protecting layer at the point corresponding to the window has been completely removed in the grinding out of the window on the tube for the passage of the Röntgen rays.

Figure 2:
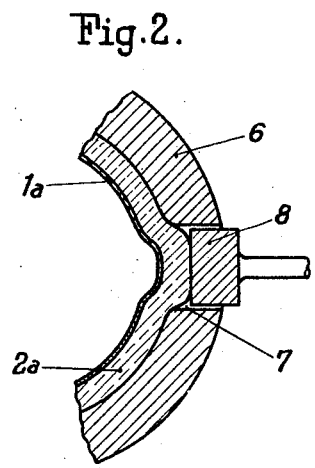
Figure 3:
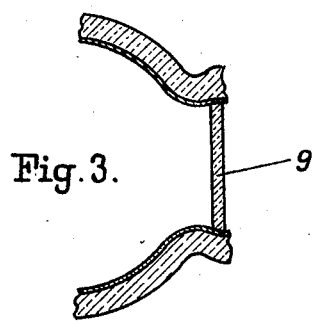

The invention will be further described with reference to the accompanying drawing showing by way of exemplification an embodiment thereof in connection with a Röntgen tube in Fig. 1 in longitudinal section, while Figs. 2 and 3 are fractional views to illustrate the production of an interruption of continuity in the tube for the purpose of providing the same with a window.

In the drawings the high vacuum tube is indicated conventionally at 1; it does not need to possess very thick walls, inasmuch as the mechanical strength of the tube is insured by the protecting coating 2 which, in order to perform a sufficient protecting action, should at least possess a thickness of, for instance, 10 millimeters.

In accordance with the illustration of Fig. 1, the protecting glass coating is provided with a window 3, while the high vacuum tube 1 is completely continuous and not interrupted by a window or the like. The cathode of the tube is indicated at 4 and the anticathode at 5. The window 3 in the protecting coating 2 may be produced by grinding. This protecting coating 2 may consist of colored glass in order to reduce the escape of rays of light.

Instead of producing the window, as in the form of construction in accordance with Fig. 1, by grinding or by the etching off of the enveloping coating, an interruption of the glass coating may also be produced, as indicated in Fig. 2, in the blowing of the tube by employing a mould 6 with an opening 7 at a suitable point thereof and within which a plunger or the like 8 is adapted to be displaced. As soon as the blowing in the mould 6 is nearly completed, the plunger 8 is withdrawn and the glass, while still in a soft condition, projects into the then exposed aperture 7, so that a boss is produced which facilitates the grinding operation. The grinding off, when a boss or swelling of this kind has been provided, may easily be carried so far that an interruption is not only produced in the layer of protecting coating 2ª, but also in the high vacuum glass 1ª, whereupon the opening thus produced in the layer 1ª is closed by the welding of a suitable glass plate onto the edge of the opening in the high vacuum glass.

Whenever desired, the window 9 may also be given filtering properties for soft Röntgen rays by manufacturing it of a suitable kind of glass, thus for instance of a glass with a suitable content of oxides of metals of high atomic weight, such for instance lead, zinc, barium or the like.

In further pursuance of the invention the opening 3 in the protecting envelope of the exemplification according to Fig. 1 may likewise be closed by a window having suitable filtering properties. When proceeding in this manner, it is preferable to arrange the filtering action in accordance with the minimal filters suggested by law for translumination.

A tube manufactured in accordance with this invention is not only adapted to admit of the generation of a very high vacuum on account of the particular nature of the interior glass selected in view of the high vacuum desired, but it also possesses very high mechanical strength in view of the strong exterior protective envelope and, though in view of the thick protective layer it is of course heavier than the ordinary Röntgen tube of high vacuum glass, it is easier of manipulation owing to the possibility of dispensing with the necessity of a special protective hood, which in turn results in an appreciable reduction of the total weight of the Röntgen arrangement. The tube, moreover, possesses highly favorable electric properties, both as regards its safety from sliding sparks as well as from kicking through or breaking of the insulation, the more so, since any possible bubbles and streaks present in the glass are not injurious in view of the great thickness of the protecting layer. It therefore becomes unnecessary to assort the product in accordance with the presence of bubbles and streaks, so that the manufacturer has only to take into account any possible waste in consequence of the manufacture of the window.

As compared with an ordinary lead glass tube, the compound tube hereinbefore described presents the advantage that, in view of the high softening point of the Röntgen glass which is several hundred degrees above that of the lead glass, the new product of manufacture is better adapted to withstand the temperature strains occurring in a glowing cathode tube.

It should be understood in this connection that, while the invention has been shown and described for purposes of illustration in connection with a preferred embodiment, it is not restricted thereto, but it is susceptible of modifications and changes in accordance with varying conditions of application and the convenience of the operator, and without deviating from the spirit of the invention, as particularly pointed out in the appended claims.

I claim:—

1. The method of manufacturing a Röntgen tube, which consists in melting onto a tube of high vacuum Röntgen glass an outer protective glass envelope and providing an interruption of continuity in said envelope.

2. The method of manufacturing a Röntgen tube, which consists in melting onto a tube of high vacuum Röntgen glass an outer protective glass envelope removing a certain field from said protective envelope and closing the same by glass adapted to allow the escape of Röntgen rays.

3. As a new article of manufacture a glass bulb for a Röntgen tube having a compound wall comprising an inner layer of high vacuum glass permeable for Röntgen radiation and an outer layer having protective qualities against Röntgen radiation, the layers being in welding connection with each other.

4. As a new article of manufacture a glass bulb for a Röntgen tube having a compound wall comprising a thin inner layer of high vacuum glass permeable for Röntgen radiation and a considerably thicker outer layer having protective qualities against Röntgen radiation, the layers being in welding connection with each other.

5. As a new article of manufacture a glass bulb for a Röntgen tube having a compound wall comprising a thin inner layer of high vacuum glass permeable for Röntgen radiation and a considerably thicker outer layer having protective qualities against Röntgen radiation and being locally interrupted so as to allow escape of Röntgen rays through the interruption, the layers being in welding connection with each other.

6. As a new article of manufacture a Röntgen tube having a compound glass wall, the inner layer consisting of a high vacuum glass permeable for Röntgen radiation and the outer of a kind of glass having protective qualities for Röntgen radiation the outer layer being materially thicker than the inner and being in welding connection therewith, an interruption being provided therein for the escape of Röntgen rays.

7. As a new article of manufacture, a Röntgen tube provided with a field of different glass adapted for the escape of Röntgen rays the tube further provided with an outer protective glass coating integral therewith said coating provided with a window registering with the field of different glass in the tube.

8. The method of manufacturing Röntgen tubes and the like, which consists in melting onto a tube of high vacuum Röntgen glass an outer protective glass envelope, and removing a distinct field from said envelope.

In testimony whereof I have signed this specification.

ARTHUR FRITZ WUROMUS.